April 3, 1934.  P. E. KRAATZ  1,953,860
ROPE FASTENING DEVICE
Filed Sept. 30, 1932
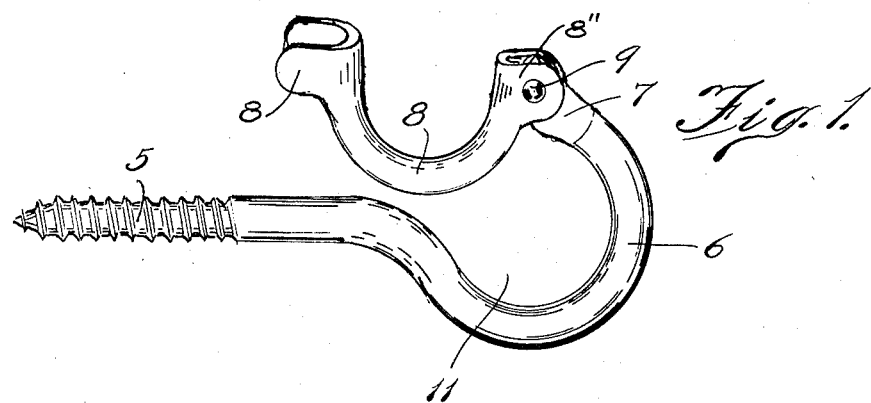
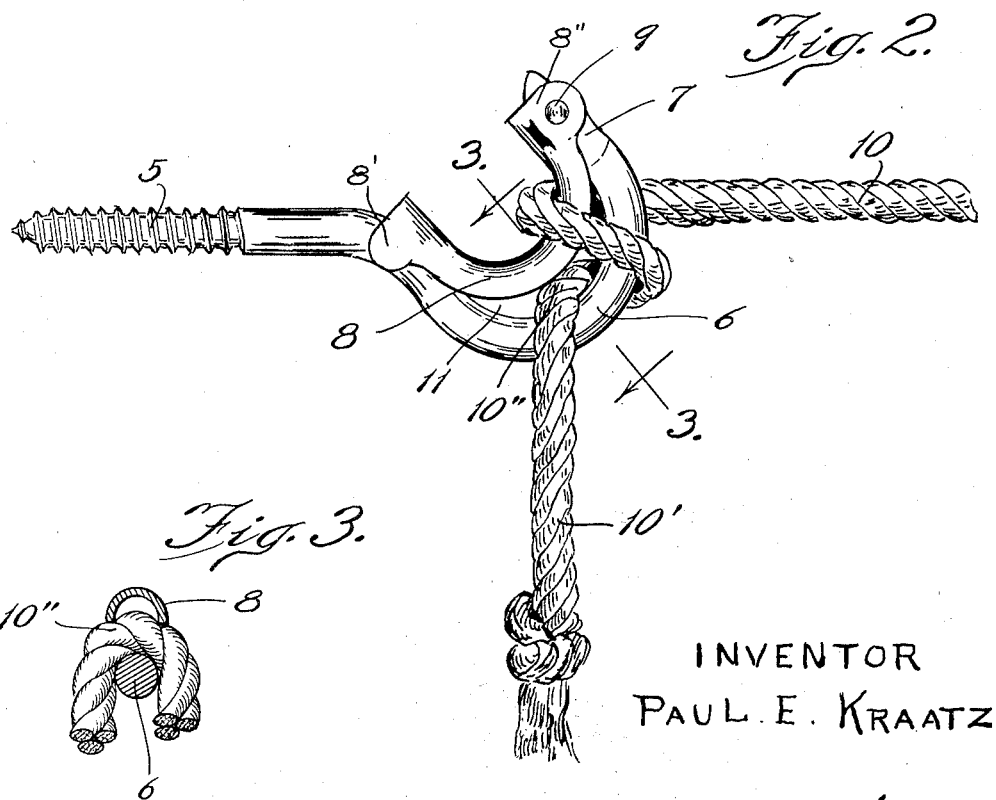
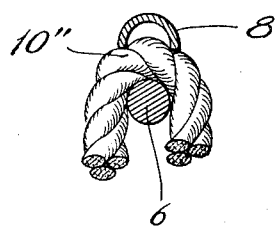
INVENTOR
PAUL E. KRAATZ Patented Apr. 3, 1934

1,953,860

UNITED STATES PATENT OFFICE 1,953,860

ROPE FASTENING DEVICE

Paul E. Kraatz, Evanston, Ill., assignor of one-half to Wellington J. Quirk, Evanston, Ill.

Application September 30, 1932, Serial No. 635,469

9 Claims. (Cl. 24—132)

More particularly the invention relates to a device for fastening or securing a rope, cable or other flexible member, it being an object of the invention to provide a new and improved device of this character for securing the end of a rope or the like without knotting it.

Another object is to provide a fastening device which is of simple and inexpensive construction, which is readily operable for the purpose of inserting a rope, and which is extremely effective in holding the rope.

Another object is to provide such a device of new and improved construction which automatically binds and securely holds the rope due to the pull thereon.

Further objects and advantages will become apparent from the following detailed description taken in connection with the accompanying drawing, in which:

Fig. 1 illustrates a preferred form of the invention in the form of a screw hook with the clamping member extended to permit the insertion of a rope.

Fig. 2 illustrates the same device with a rope end attached thereto.

Fig. 3 is a section along the line 3—3 of Fig. 2.

While I have shown in the drawing and shall herein describe in detail a preferred form of my invention embodied in a screw hook, it is to be understood that I do not thereby intend to limit the invention to the specific form disclosed, but aim to cover all modifications and alternative constructions falling within the spirit and scope of the invention as expressed in the appended claims.

As illustrated in the drawing, the invention is incorporated in a screw type hook having an anchoring means in the form of a screw threaded shank 5 and a rope attaching means in the form of a curved or bent attaching member 6. The member 6 is preferably round or rounded so that a rope will slide easily thereon without injurious wear.

In order to fasten a rope securely to the attaching member a clamping means is provided which is herein disclosed as comprising a curved or U-shaped clamping member 8. The ends of this member are preferably provided with pairs of ears 8' and 8" so that these ears will straddle the attaching member 6 when a rope is attached as shown in Fig. 2. This prevents lateral movement of the clamping member relatively to the attaching member. Preferably the clamping member is movably secured at one end to the member 6, this being accomplished in the present form of the invention by a pivot pin 9 which extends through the ears 8" of the clamping member and the flattened end 7 of the hook.

As illustrated in Fig. 2, a rope 10 is passed over the clamping member 8 while in the position illustrated in Fig. 1, and is then passed down around the curved portion 6 of the hook, and back through the space 11 between the clamping member and hook, whereupon by allowing the clamping member to assume the position shown in Fig. 2 and pulling on the end 10' of the rope the horizontal portion of the rope may be pulled taut. Thereupon when the end 10' is released the pull on the horizontal portion of the rope against the clamping member 8 causes the edges of the clamping member to grip or bite into the portion 10" of the rope passing between the hook and the locking member. To release the rope it is merely necessary to raise the locking member slightly and let the end 10' slip through.

The clamping member 8 is preferably arcuate in section as illustrated in Fig. 3, in order that the outside thereof will present a smooth surface over which the rope may be drawn and so that the edges thereof will serve as jaws for engaging and biting into the rope portion 10" so as to secure the rope effectively to the hook. As illustrated herein, the portion of the clamping member which engages the rope portion 10" is spaced from the pivot 9, and the rope passes over the clamping member at a point intermediate the jaw portion of the clamping member and the pivot 9. The free end of the clamping member 8 converges toward the curved portion 6 of the hook so as to prevent the loose end 10" of the rope from slipping out. This provides an effective clamping means and at the same time permits the rope to be pulled through the fastening device in order to make the horizontal portion of the rope taut.

The device disclosed herein is extremely simple in construction and is remarkably effective in use, and as is readily apparent the insertion and fastening of the rope end may be accomplished without any particular skill. Although I have illustrated the invention as incorporated in a screw hook, it is obvious that it may be used equally well in connection with any other form of anchoring means.

I claim as my invention:

1. A rope fastening device comprising, in combination, a hook having a curved rope attaching member, a curved clamping member pivoted at one end to the tip of the attaching member and swingable in the plane of the attaching member to a position alongside the attaching member, said clamping member being arcuate in section at a point spaced from said pivot so as to form laterally spaced jaws adapted to engage a rope passed over the attaching member and to provide a smooth external surface for a portion of the rope passing around the clamping member, said clamping member having ears at its free end arranged to straddle the rope attaching member and prevent lateral movement of the clamping member.

2. A rope fastening device comprising, in combination, a hook having a curved rope attaching member, a U-shaped clamping member having pairs of ears at each end straddling the attaching member, a pivot pin securing one end of the clamping member to the attaching member, said clamping member being arcuate in section intermediate its ends so as to provide jaws for engaging a rope passing between the attaching member and clamping member and having its free end converging toward the attaching member, and to provide a smooth external surface for the portion of the rope passing around the clamping member.

3. A rope fastening device comprising, in combination, a hook having a curved rope attaching member, a U-shaped clamping member having pairs of ears at each end straddling the attaching member, a pivot pin securing one end of the clamping member to the attaching member, said clamping member being formed intermediate its ends so as to provide locking means for engaging a rope passing between the attaching member and clamping member.

4. A rope fastening device comprising, in combination, a hook having a curved rope attaching member, a U-shaped clamping member having a pair of ears at each end arranged to straddle the attaching member when a rope is clamped therebetween, and a pivot pin securing one end of the clamping member to the attaching member.

5. A rope fastening device comprising, in combination, a curved rope attaching member, and a curved clamping member movable in the plane of the attaching member and pivoted at one end to the attaching member, said clamping member being arcuate in section and having edges forming rope gripping jaws, and having an outside rope engaging portion, so that by passing the end of a rope to be anchored over the clamping member, then down and around the attaching member and clamping member, the tension on the rope serves to hold the clamping member against the rope and the rope clamped between the two members.

6. A rope fastening device comprising, in combination, a rope attaching member, and a clamping member movable in the plane of the attaching member and pivoted at one end to the attaching member, said members having opposed rope engaging portions spaced from the pivot, and said clamping member having an outside rope engaging portion intermediate the pivot and said opposed portions, the free end of said clamping member and said attaching member converging so as to prevent the portion of the rope therebetween from slipping out along said members.

7. A rope fastening device comprising, in combination, a rope attaching member, a clamping member pivoted at one end to the attaching member, said clamping member having inside rope gripping portions spaced from the pivot, and an outside rope engaging portion intermediate the pivot and inside rope gripping portion.

8. A rope fastening device including a hook, a movable clamping member carried by said hook, and means adjacent the free end of said clamping member for preventing lateral movements of said clamping member.

9. A rope fastening device including a hook, and a clamping member pivoted at its inner end to the terminal of said hook and movable to an open and inoperative position, from which position it may swing by gravity to an operative position alongside the hook to engage a rope therebetween.

PAUL E. KRAATZ.